Aug. 28, 1923.
J. A. S. HAMMOND
PROCESS OF DEHYDRATING LIQUID ETHER
Filed Dec. 29, 1921
1,466,436
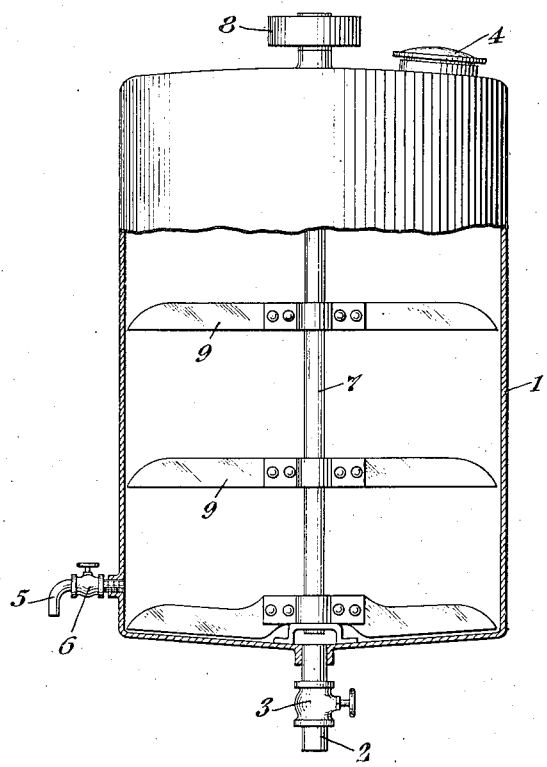
John A. S. Hammond
INVENTOR
BY Prindle, Wright, & Small.
ATTORNEYS Patented Aug. 28, 1923.

1,466,436

UNITED STATES PATENT OFFICE.

JOHN A. S. HAMMOND, OF WOODLAWN, MARYLAND, ASSIGNOR TO U. S. INDUSTRIAL ALCOHOL CO., A CORPORATION OF WEST VIRGINIA.

PROCESS OF DEHYDRATING LIQUID ETHER.

Application filed December 29, 1921. Serial No. 525,708.

*To all whom it may concern:*

Be it known that I, JOHN A. S. HAMMOND, a citizen of the United States, a resident of Woodlawn, in the county of Baltimore and State of Maryland, have invented a certain new and useful Process of Dehydrating Liquid Ether, of which the following is a specification.

The object of this invention is to completely dehydrate ethyl ether in the liquid state so that it will contain substantially no water in order to procure a pure ether fit for anaesthetic purposes and also for other uses wherein such a product is highly desirable. Water is a harmful impurity in ether for it causes the formation of secondary impurities upon standing with ether for a long period of time. It has been found to be a very difficult matter to remove all of the water from ether due to the tenacity with which the ether clings to the last portions of water below 1%.

According to this invention, the dehydration of ether is accomplished by repeated treatments with sodium hydroxide, using due precautions to avoid the presence of moisture or water in the vessels before and during the treatments. The ether cannot be dehydrated by a single treatment since its power to retain the last portions of water is so great that the dehydrating agent, namely sodium hydroxide, is unable to effect a quantitive removal of the water in one operation.

A preferred embodiment of the process consists in treating ether containing the water with sodium hydroxide in the proportion of about 4% sodium hydroxide based on the weight of the ether. This mixture is allowed to stand about 12 hours with frequent shaking and is then decanted. This treatment is followed by a second treatment with 4% of freshly fused sodium hydroxide which is allowed to stand with the ether until it is substantially dry, as determined by a test with aluminum ethylate reagent, this second treatment usually requiring about six hours. When performing this second step of the process, care should be taken that the vessel in which the operation is performed is strictly dry and if the same vessel is used as in the first dehydration treatment it should first be carefully freed from all moisture resulting from the first treatment.

Two operations as just described are as a rule sufficient, but if the ether is not quite dry, one or more additional treatments with fused caustic soda may be employed to obtain anhydrous ether. In all cases distillation is unnecessary, and simple decantation will suffice to remove the sodium hydroxide from the ether. The fused sodium hydroxide left over from the second treatment may be used again for the first treatment of another quantity of aqueous ether.

In order to expeditiously carry out the process, an apparatus as illustrated in the accompanying drawing may be employed. In said drawing, there is shown a tank 1 provided with a draw-off pipe 2 having a valve 3, a manhole 4, and a draw-off cock 5 provided with a valve 6. A shaft 7 is positioned centrally within the tank and has mounted thereon a pulley 8 connected with a suitable source of power not shown. Blades 9 are fixed at suitable intervals on the shaft for the purpose of agitating materials within the tank 1. The ether to be dried is poured into the tank together with the sodium hydroxide, and agitated therein by the blades 9 until the sodium hydroxide has absorbed the maximum amount of water, which will require about 12 hours. After this treatment, the liquids are allowed to settle and separate, and the ether layer may be drawn off through the cock 5, after which the alkaline liquid is removed through pipe 2. The tank, if it is to be used for the second treatment, should now be cleaned free from any adhering drops of water or moisture, and the sodium hydroxide should also be completely removed. The ether obtained from the first treatment is now poured back into the tank with freshly fused sodium hydroxide, and the treatment is repeated until the ether is strictly anhydrous. The ether is removed by drawing off as before. A duplicate tank may of course be used for the second treatment which will avoid the necessity of waiting to clean out the tank after the first treatment. While sodium hydroxide has been successfully used and has important advantages, potassium hydroxide may also be used.

Decantation, or drawing off of the ether as described, is sufficient to separate it from the aqueous liquid or hydroxide, and no distillation is necessary.

As many apparently widely different embodiments of this invention may be made without departing from the spirit thereof, it is to be understood that I do not intend to limit myself to the specific embodiment thereof except as indicated in the appended claims.

I claim:

1. The process of dehydrating ethyl ether in the liquid state comprising treating it with sodium hydroxide two or more times, the final treatment being carried out with anhydrous sodium hydroxide.

2. The process of dehydrating ethyl ether in the liquid state comprising treating it with sodium hydroxide two or more times, the final treatment being carried out with freshly fused sodium hydroxide.

3. The process of dehydrating ethyl ether in the liquid state comprising treating it with about 4% by weight of sodium hydroxide and then treating it with about 4% by weight of anhydrous sodium hydroxide.

4. The process of dehydrating ethyl ether in the liquid state comprising treating it with about 4% by weight of sodium hydroxide and agitating the mixture, and then treating it with about 4% by weight of anhydrous sodium hydroxide and agitating the mixture.

5. In the dehydration of ethyl ether by sodium hydroxide, the improvement characterized by adding a final treatment with anhydrous sodium hydroxide under anhydrous conditions.

6. The process of dehydrating ethyl ether in the liquid state comprising treating it with an alkali hydroxide two or more times, the final treatment being carried out with anhydrous hydroxide under anhydrous conditions.

7. The process of dehydrating ethyl ether in the liquid state comprising treating it with an alkali hydroxide two or more times and decanting the ether from the aqueous liquid and hydroxide, the final treatment being carried out with anhydrous hydroxide under anhydrous conditions.

8. The process of dehydrating ethyl ether in the liquid state comprising treating it with about 4% of an alkali hydroxide two or more times and decanting the ether from the aqueous liquid or hydroxide, the final treatment being carried out with anhydrous hydroxide under anhydrous conditions.

In testimony that I claim the foregoing, I have hereunto set my hand this 5th day of December, 1921.

JOHN A. S. HAMMOND.